(12) United States Patent
Patel

(10) Patent No.: US 8,534,372 B2
(45) Date of Patent: Sep. 17, 2013

(54) MULTI DRILL CULTIVATOR

(76) Inventor: Chaitanya A. Patel, Ahmedabad (IN)

( * ) Notice: Subject to any disclaimer, the term of this patent is extended or adjusted under 35 U.S.C. 154(b) by 0 days.

(21) Appl. No.: 13/516,666

(22) PCT Filed: Aug. 19, 2011

(86) PCT No.: PCT/IN2011/000551
§ 371 (c)(1),
(2), (4) Date: Jun. 5, 2012

(87) PCT Pub. No.: WO2012/053000
PCT Pub. Date: Apr. 26, 2012

(65) Prior Publication Data
US 2012/0247793 A1 Oct. 4, 2012

(30) Foreign Application Priority Data
Oct. 18, 2010 (IN) .......... 2895/MUM/2010

(51) Int. Cl.
A01B 39/19 (2006.01)

(52) U.S. Cl.
USPC ................. 172/44; 172/57; 172/676

(58) Field of Classification Search
USPC ........... 172/44, 48, 57, 58, 105, 124, 257, 172/431, 436, 527, 676
See application file for complete search history.

(56) References Cited

U.S. PATENT DOCUMENTS

| | | | | |
|---|---|---|---|---|
| 28,687 A | * | 6/1860 | Pomeroy | 172/58 |
| 455,170 A | * | 6/1891 | Cleveland | 172/57 |
| 941,951 A | * | 11/1909 | Reynolds | 172/348 |
| 1,184,276 A | * | 5/1916 | Townsend | 172/57 |
| 1,773,672 A | * | 8/1930 | Grim | 172/49 |
| 1,865,351 A | * | 6/1932 | Albaugh et al. | 172/58 |
| 2,167,595 A | * | 7/1939 | Tipcke | 172/537 |
| 2,277,880 A | * | 3/1942 | Noble | 172/134 |
| 2,321,464 A | * | 6/1943 | Cook | 172/300 |
| 3,949,813 A | | 4/1976 | Van der Lely | |
| 6,662,880 B2 | * | 12/2003 | Manor | 172/48 |

FOREIGN PATENT DOCUMENTS

| | | |
|---|---|---|
| FR | 694549 | 12/1930 |
| GB | 182128 | 6/1923 |
| IN | 224088 | * 7/2008 |
| IN | 224088 | 9/2008 |

OTHER PUBLICATIONS

International Search Report issued in PCT/IN2011/000551, dated Feb. 13, 2012, 2 pages.

* cited by examiner

Primary Examiner — Matthew D Troutman
(74) Attorney, Agent, or Firm — Klarquist Sparkman, LLP

(57) ABSTRACT

An improved multi drill cultivator which mainly consists of octagonal central drum (2), gear housing Assembly which further comprise of four big gears, four bevel gears and cover (3.i), teeth for big gears, chassis, drill Ploughing Assembly further comprises of projected portion and drills, bearing housing further comprises of bearing and collar for bearing, rear wheel Assembly further comprises of rear wheel and rear wheel axle, front wheel assembly further comprise of front wheel and front wheel bracket, front wheel bracket hub, one end of front wheel, other end of front wheel bracket, lock nut, A jack screw mechanism consists of lifting screw steering wheel, a guide bar being attached to the lifting screw steering wheel, drum lifting block and a ball wherein the said ball is fixed into the locking for ball, provided at the end of the said jack screw mechanism assembly.

22 Claims, 11 Drawing Sheets

MULTI DRILL CULTIVATOR

CROSS REFERENCE TO RELATED APPLICATIONS

This is the U.S. National Stage of International Application No. PCT/IN2011/000551, filed Aug. 19, 2011, which was published in English under PCT Article 21(2), which in turn claims the benefit of Indian Application No. 2895/MUM/2010, filed in India on Oct. 18, 2010. Both applications are hereby incorporated by reference herein in their entirety.

FIELD OF INVENTION

The present invention relates to an improved multi drill cultivator. More particularly, it is an improvement over the Indian patent IN224088 granted to the same applicant.

BACKGROUND OF THE INVENTION

The farmer cultivates the land in order to sow crops and pastures. In general, a cultivator is known as an agricultural machine either powered by an engine or driven by an animal, which breaks up and ploughs the lands and the fields, preparing the soil for planting. Powered engine/power driven cultivators are costly and also have high operational and maintenance cost. Thus power driven cultivators are not affordable by common man/farmer. Generally tractors are used as a power driven agriculture machine. Animal driven cultivator are used in the remote area but they are not ergonomically designed thus required much effort for operation and at the same time it gives more burden to the animal, which drives the cultivator. Thus it is desirable to design an improved animal driven multi drill cultivator which reduces burden to the animal and which is efficient, economical and easily operable.

The Indian Patent no. 224088 granted to the same applicant of the present invention relates to a multi drill cultivator being used for cultivating or ploughing the land for agricultural and gardening purpose. A multi drill cultivator for cultivating land comprises: a cylindrical part having cylinder shaped body with openable top cover and being placed horizontally, the said cylinder part comprises a gearbox which is placed inside the cylindrical part, said cylinder shaped body having at least four outwardly projected portions being connected to said gear box; a chassis to facilitate mounting of said cylindrical part; a pair of rear wheels being connected at the two ends of the cylindrical part and one front wheel being connected to chassis, the combination of said rear wheels and front wheel facilitate rolling of the cylindrical part over ground; at least four drills being accommodated in the outwardly projected portions of the cylinder shaped body of said cylindrical part, said drill faces towards front wheel; a jack screw mechanism for adjusting angular movement of said drill; a towing bar being fixed near top of the front wheel for providing harnessing of driving mechanism to drive said cultivator; and a seat being provided on operable top cover of cylinder shaped body of said cylinder part for facilitating sitting of a person to drive said cultivator; wherein the motion of rear wheels and front wheel achieved by driving mechanism gets converted through said gear box and leads to an adjustable, forward, angulated and simultaneously axial rotational motion of said drills to ensure proper cultivation of the land.

The present invention improves upon solutions as proposed in the above granted Patent no. IN224088. The aforementioned application has disclosed multi drill cultivator which ploughs faster and save time of the farmer by producing multifold work output, while the new solution of the present invention offers improvements on the performance as disclosed in the granted Patent no. IN224088. In the present invention, the central axel connecting the two rear wheels is divided into two equal halves, which minimizes the twisting force occurring during the turning of the cultivator. Further, the overall weight of the machine is reduced up to 100 kg that results into lesser pulling force exerted by the animal for driving the cultivator, and thus gives efficient output.

PRIOR ART

There are various inventions and machines in use which are power driven or animal driven, some of which are as discussed here.

U.S. Pat. No. 3,949,813 discloses a soil cultivator which has a beamed frame with a coupling member to be attached to a tractor. A plurality of rotatable tined soil working members is mounted in a row that extends transverse to the direction of travel. The soil working members are power driven by driving means to rotate about upwardly extending axes and work overlapping strips of ground. The action of the tines breaks up the soil, even heavy soil, and a roller is connected to trail the soil working members. The roller has annular plates, the outer peripheries of which are formed by horizontally extending elongated elements that are engaged to smooth the ground behind the tines. The roller is adjustably pivoted to the frame by arms to support the weight of the cultivator. By moving the arms about pivots, the working depths of the tines and the amount of weight borne by the roller can each be regulated to a significant extent.

DISADVANTAGES OF PRIOR ART

Commercially available soil cultivators are generally tractor driven and powered by an engine and are complex in design which further adds more weight to the whole assembly, requiring more power to operate, thus are not economical.

Available soil cultivators are heavy in weight requiring more effort to operate, thus are not comfortable to operate, giving lesser efficiency.

Available cultivators are unable to brake up heavy soil sufficiently so that the operating tractors or other vehicles are subjected to undesirable vibrations and other shocks when the cultivators are in use.

Available single drill soil cultivators are able to make only single furrow at a time which requires more time to cultivate soil.

Available drill cultivators are operating in straight horizontal direction thus are not able to make deep furrows.

Available drill cultivators are generally power driven that generate noise and air pollution and thus are not environment friendly.

Therefore it is very much essential to provide an improvement over the said prior art and develop a multi drill cultivator which is environment friendly, easy to operate, efficient, cost-effective.

OBJECTS OF THE INVENTION

The main object of the present invention is to overcome all the deficiencies associated with the prior art cultivators.

It is an object of the present invention to provide an improved, environment friendly, easy to operate, efficient and cost-effective multi drill cultivator.

Yet another object of the present invention is to provide an improved multi drill cultivator that reduces the physical load on the animal while cultivating the land thereby enhances animal efficiency.

Yet another object of the present invention is to provide an improved multi drill cultivator which can break up the heavy soil easily.

Yet another object of the present invention is to provide an improved multi drill cultivator which ploughs faster in lesser time and producing at least four furrows (multifold) at a time.

SUMMARY OF THE INVENTION

According to the aforesaid objects, the present invention provides for an improved multi drill cultivator comprising of:

An octagonal central drum having openable top cover being placed horizontally;

A gear housing assembly consisting of four spur gears and four bevel gears being placed inside the gear box wherein the gear box is placed inside the octagonal central drum. The teeth of the said spur gears are placed on the surface of the said spur gears so as to reduce the space occupied due to the said spur gears into the said gear box;

The said spur gears and bevel gears are divided into two pairs, each pair consists of two spur gears attached with the said two bevel gears, mounted on different rear wheel axle, divided to reduce the twisting forced exerted during turning of the said multi drill cultivator;

A pentagonal chassis is provided to facilitate mounting of the said octagonal central drum.

A jack screw mechanism is attached to the said chassis using nut and bolt. A jack screw mechanism is provided for adjusting the angular movements of the said drills A jack screw mechanism consists of lifting the screw steering wheel, a guide bar being attached to the lifting screw steering wheel, wherein the drum lifting block and a ball is fixed into the lock for ball, are provided at the end of the said jack screw mechanism assembly. A lock for ball is also being provided to fix the said jack screw mechanism to the drill ploughing assembly;

A drill ploughing assembly consisting of at least four projected portion is attached to the octagonal central drum. At least four drills are being accommodated in the projected portion of the said octagonal central drum wherein the said drills are attached to the said four projected portions respectively and faces towards the front wheel wherein the said drills operate in circular motion, giving multiple deep furrows i.e. 1 to 4 furrows at a time;

A pair of rear wheel is being connected at the two ends of the said octagonal central drum, and one front wheel is connected to the said chassis, the combination of said rear wheels and front wheel, facilitates the rolling of the octagonal central drum over ground. Here, octagonal central drum is provided to increase the ground clearance, minimizing the friction between the said octagonal central drum and the land/ground;

A transverse bar being fixed near the top of the front wheel is provided for harnessing of driving mechanism to drive the said improved multi drill cultivator;

A triangular blade is fixed on both the sides, just behind the rear wheels, so as to deepen the rear wheel pressure furrow. These blades can be adjusted by a clasp knife mechanism using a spring and balance;

A seat is being provided on an openable top cover of octagonal central drum for facilitating sitting of a person to drive the said cultivator;

An improved multi drill cultivator comprises of three wheels, two rear wheels and one front wheel, wherein the motion of rear wheels and front wheel is achieved by the driving mechanism getting converted, through said gear box, into an adjustable, forward angulated and simultaneously axially rotating motion of said drills to ensure proper cultivation of the land.

DETAILED DESCRIPTION

Now, without limiting the invention, the embodiments of the present invention are explained with the help of the drawings.

Figure 1A:
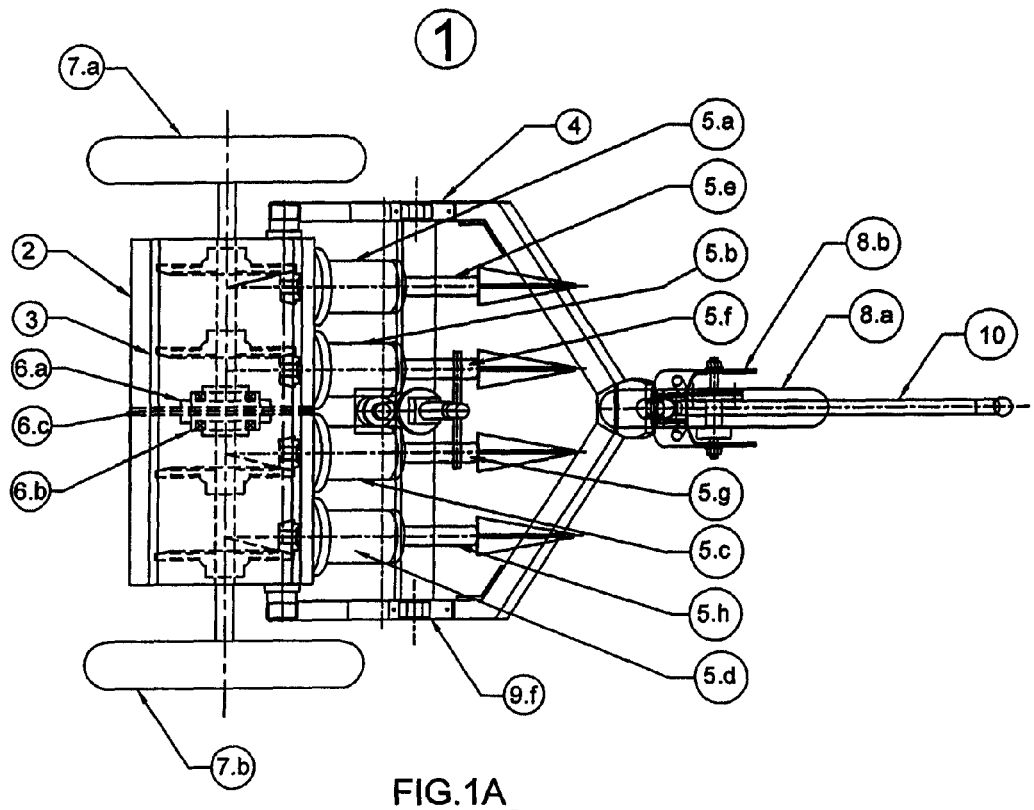
FIGS. 1.A and 1.B shows top view and front view of an improved multi drill cultivator respectively.
Figure 1B:
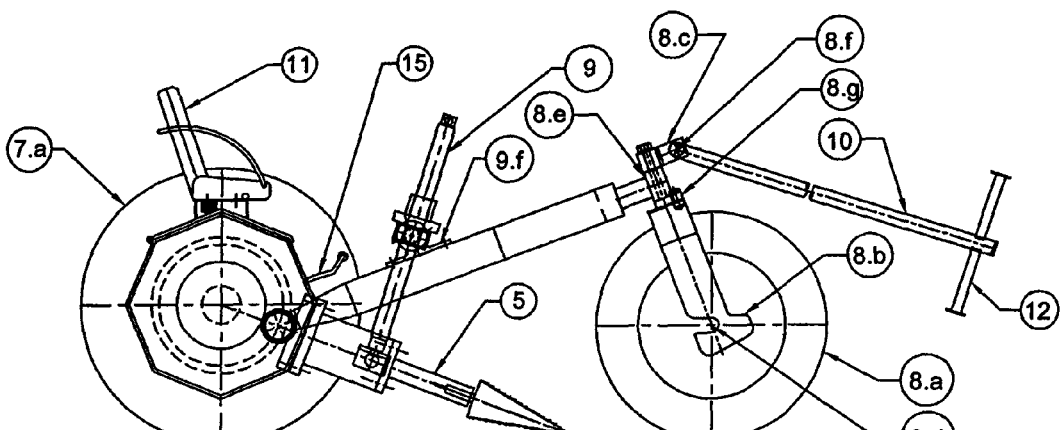
Figure 2A:
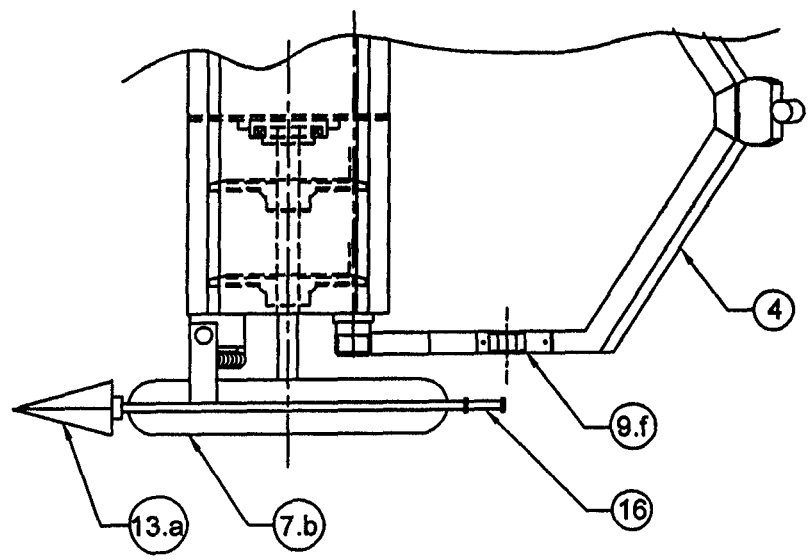
FIGS. 2.A and 2.B shows cut view of the top view and front view of an improved multi drill cultivator with triangular blade.
Figure 2B:
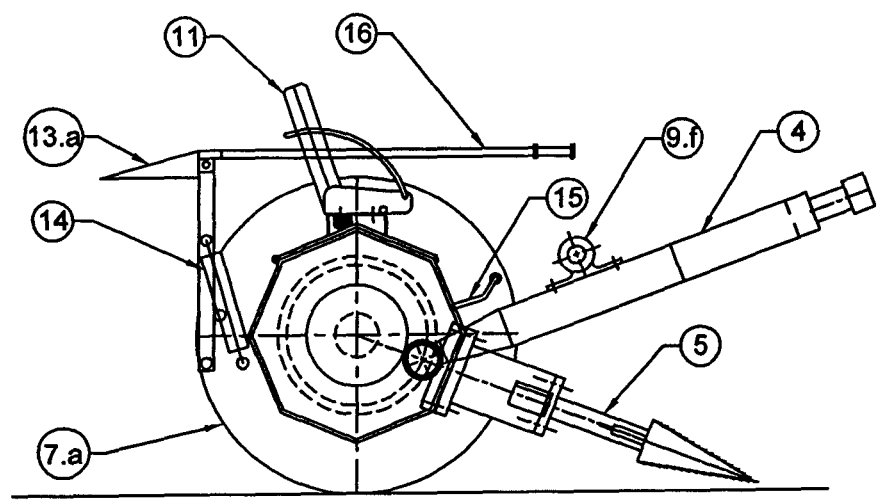
Figure 3A:
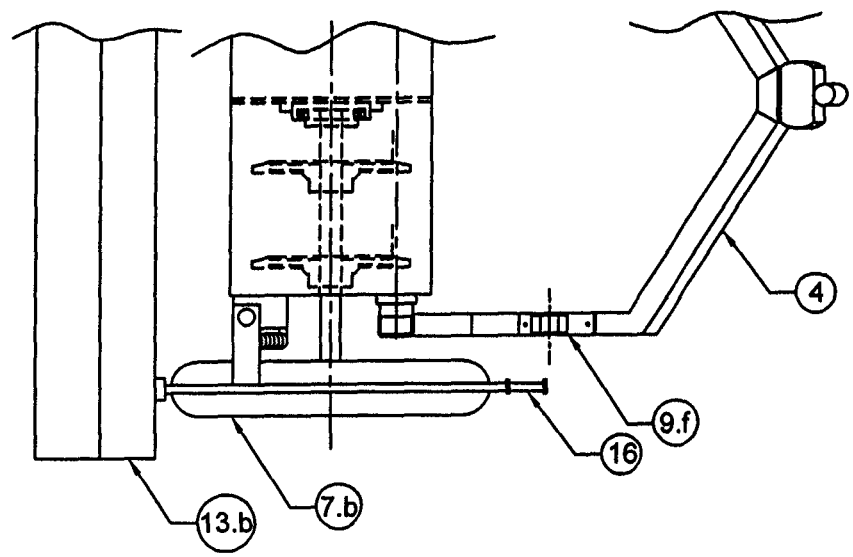
FIGS. 3.A and 3.B shows cut view of the top view and front view of an improved multi drill cultivator with spade respectively.
Figure 3B:
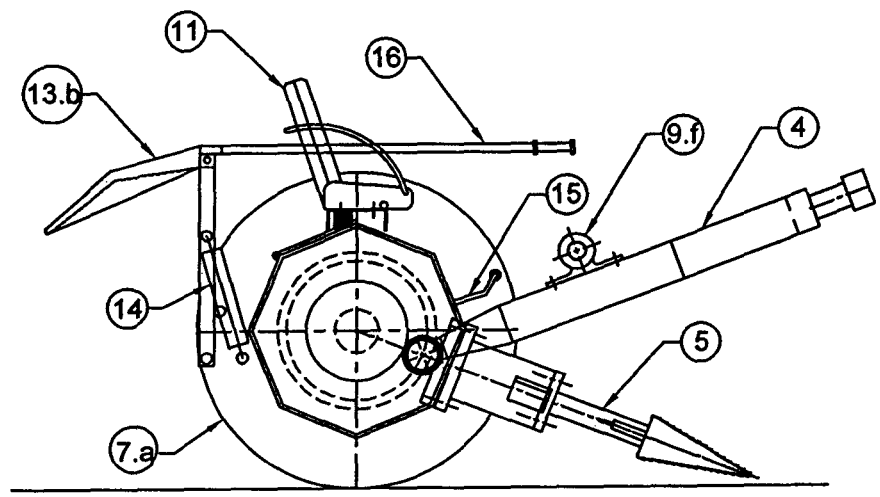
Figure 4A:
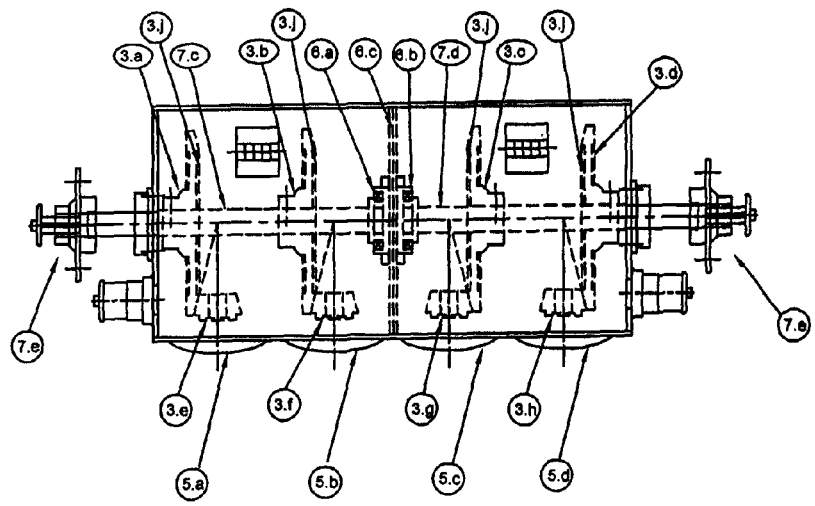
FIGS. 4.A, 4.B and 4.C shows top view and front view, side view of gear wheel assembly of an improved multi drill cultivator respectively.
Figures 4B, 4C:
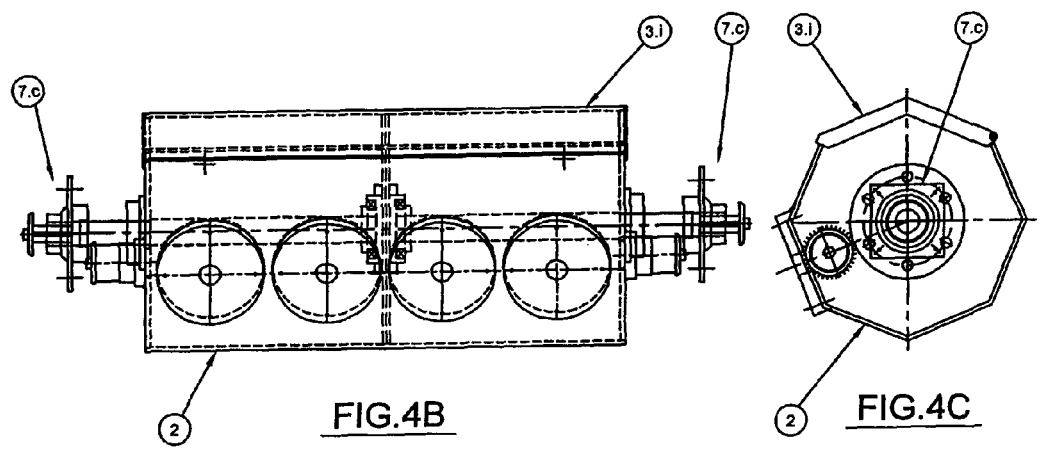
Figure 5A:
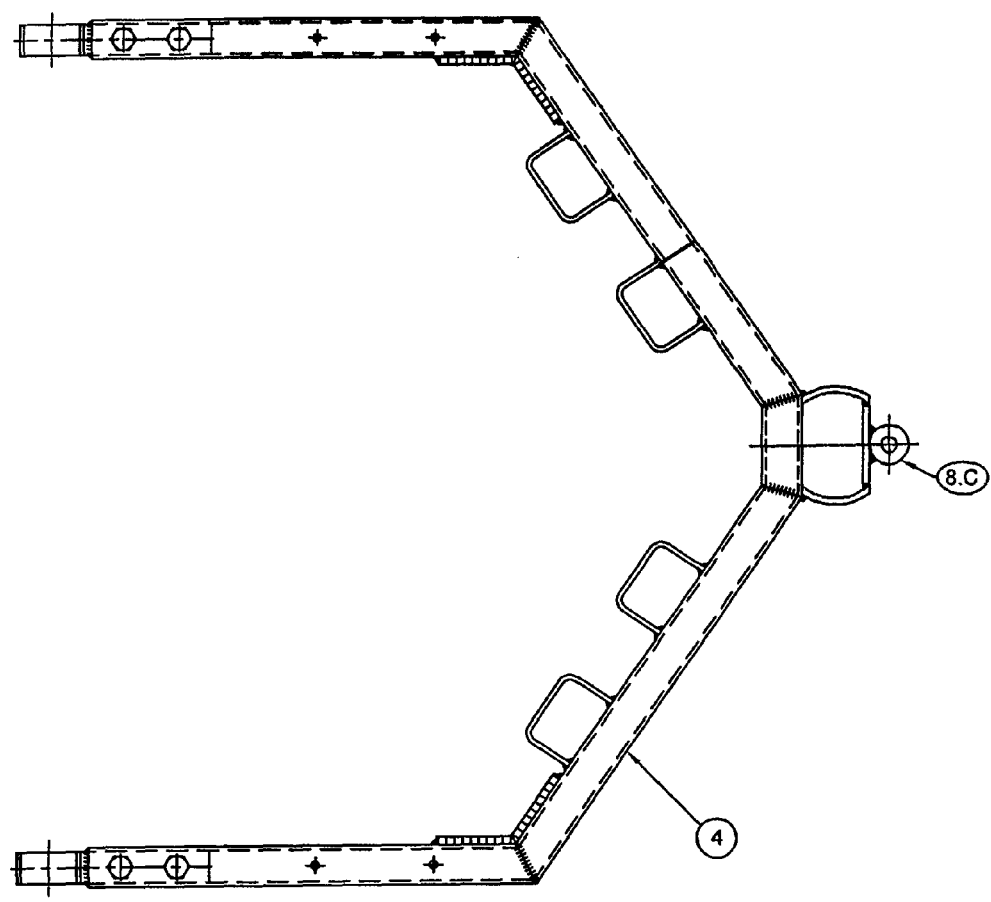
FIGS. 5.A, 5.B shows top view, front view of the chassis of an improved multi drill cultivator respectively.
Figure 5B:
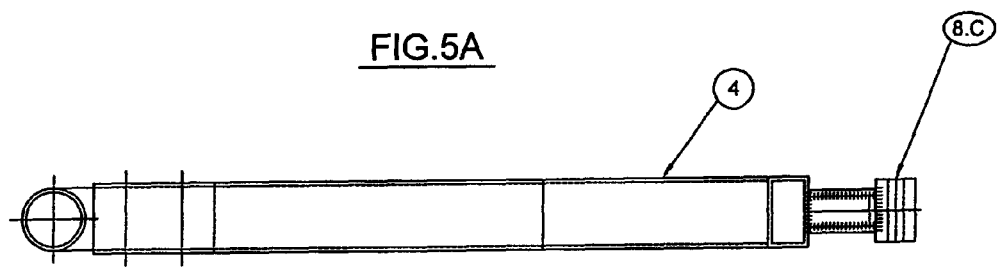
Figure 6A:
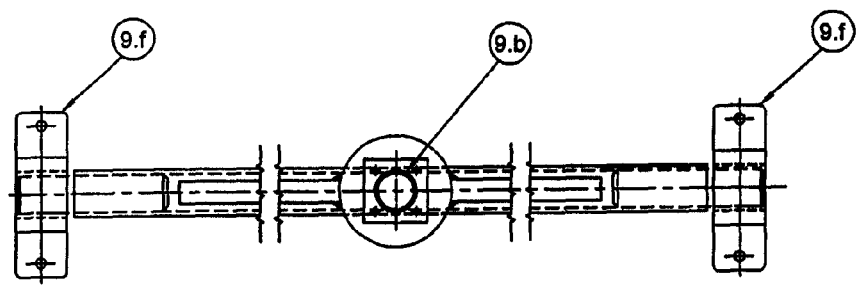
FIGS. 6.A, 6.B and 6.C shows top view, front view and side view of the jack screw mechanism of an improved multi drill cultivator respectively.
Figure 6B:
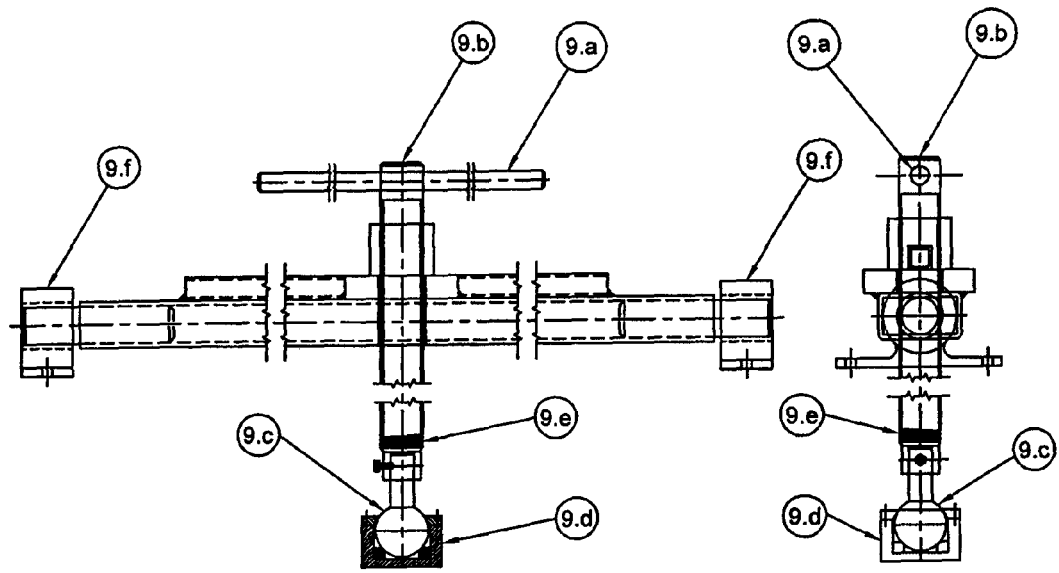
Figure 6C:
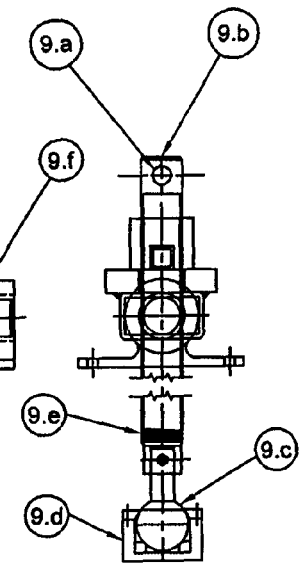
Figure 7:
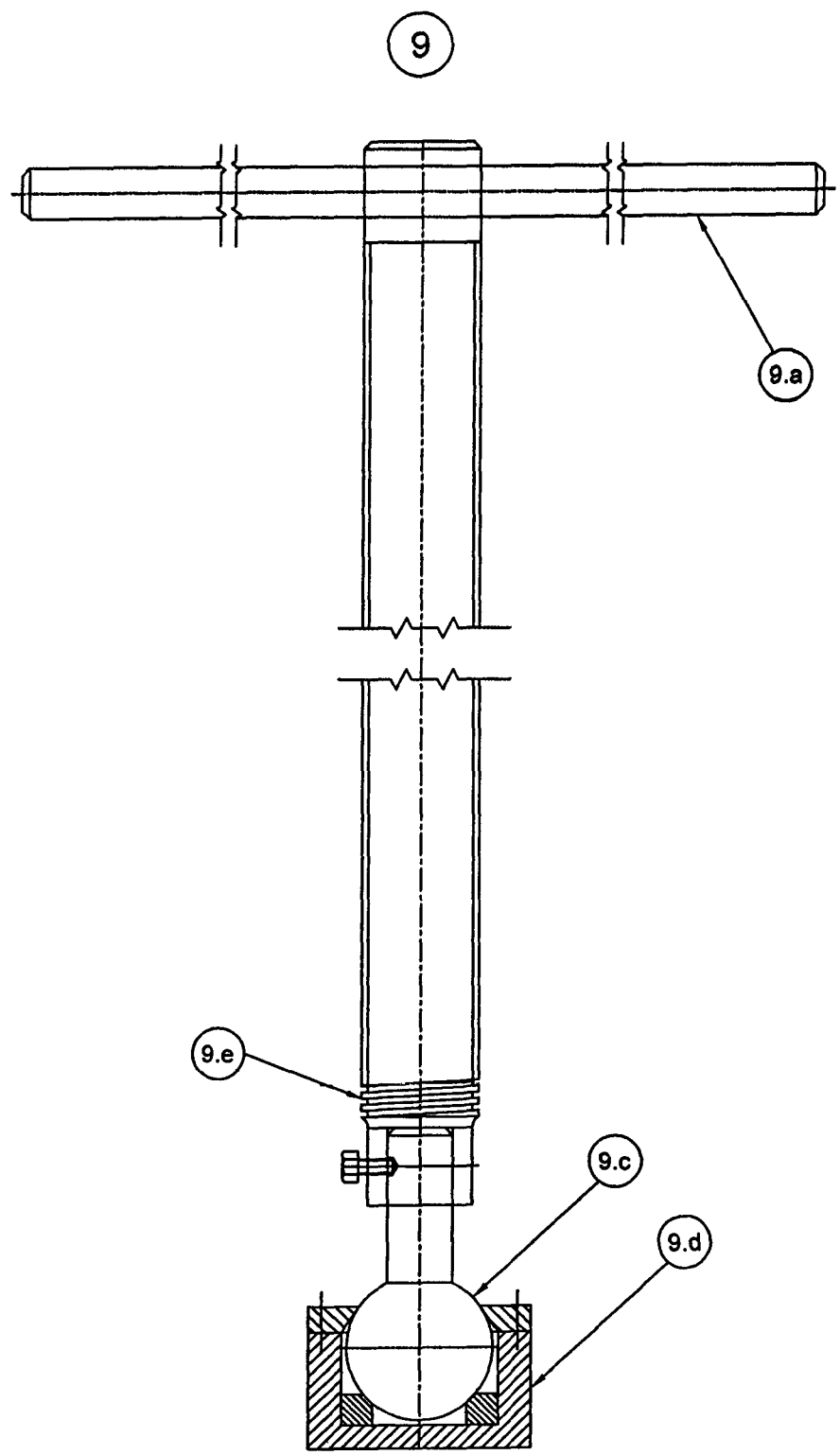
FIG. 7 shows housing of the jack screw mechanism of the multi drill cultivator respectively.
Figure 8A:
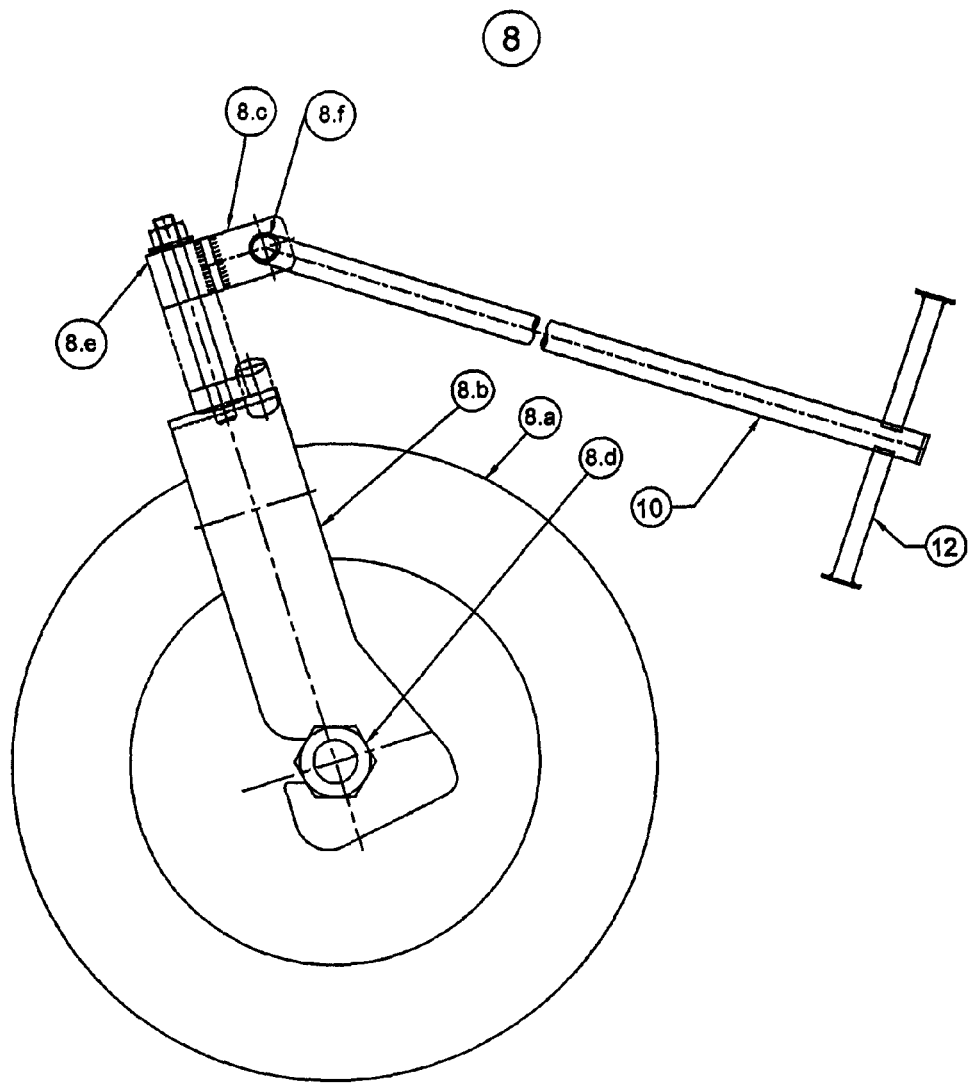
FIGS. 8.A, 8.B, 8.C and 8.D shows top view, front view, side view and front wheel bracket assembly of the front wheel bracket of an improved multi drill cultivator respectively.
Figure 8B:
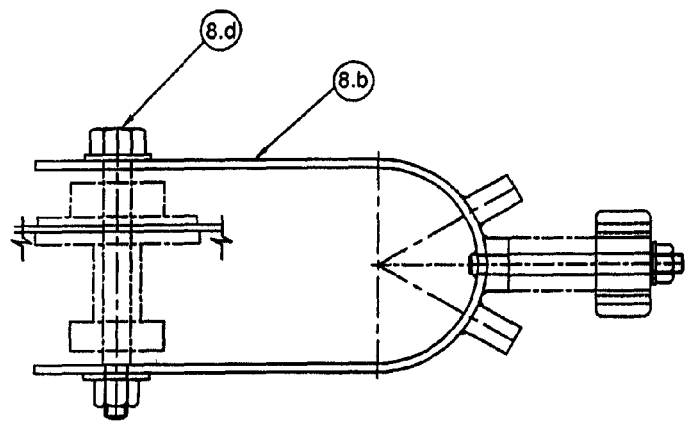
Figure 8C:
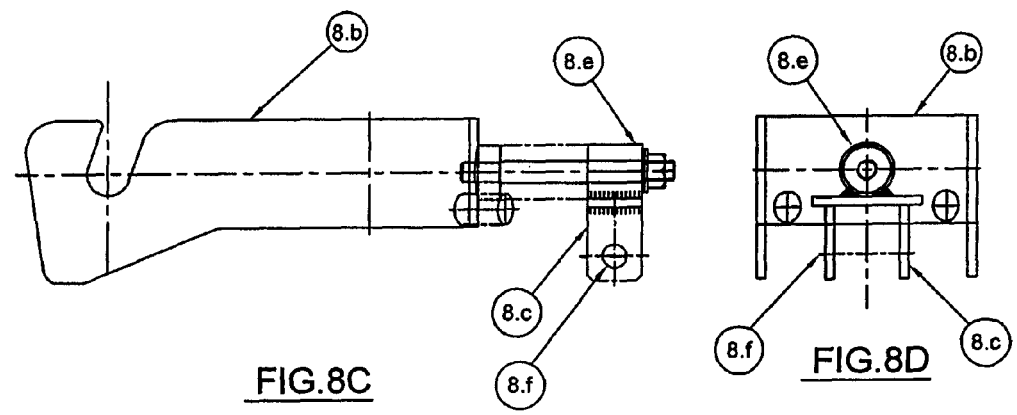
Figure 8D:
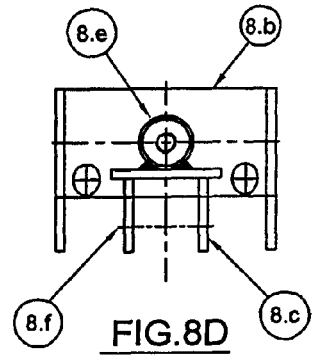
Figure 9:
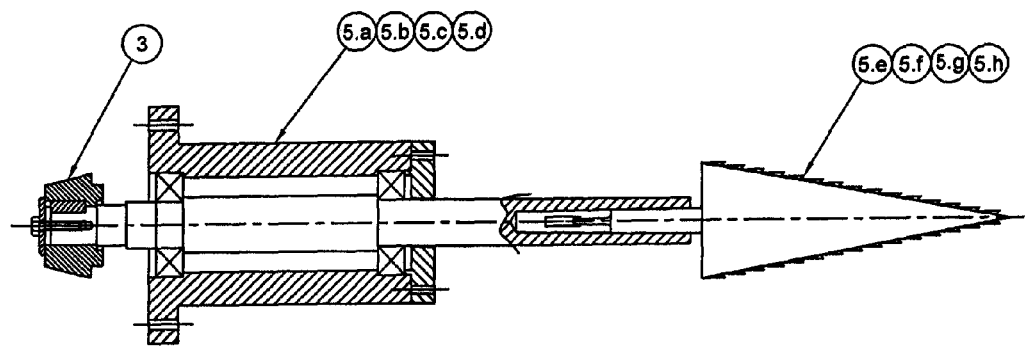
FIG. 9 shows the drill plough assembly of an improved multi drill cultivator respectively.
Figures 10A, 10B:
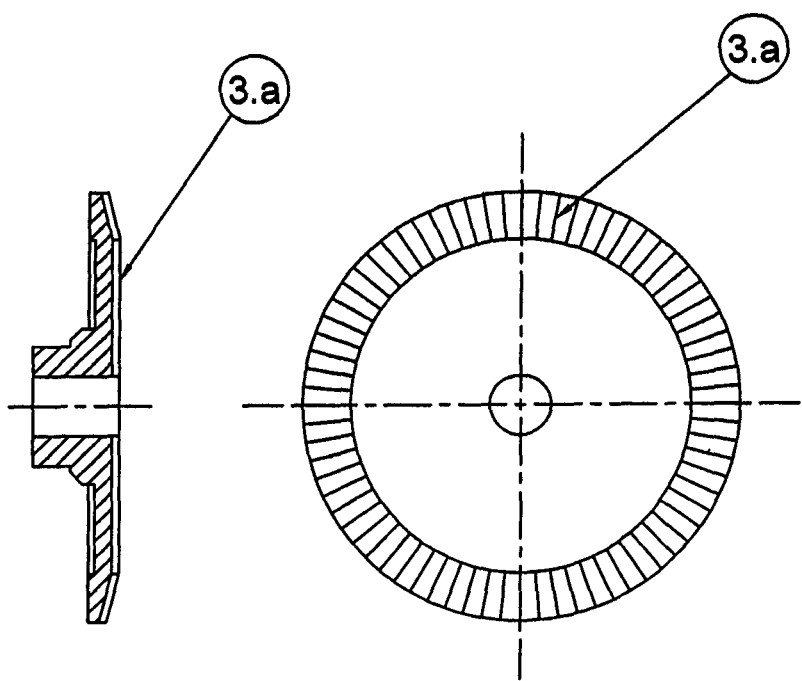
FIGS. 10.A and 10.B shows side and front view of Spur gear wheel

In a preferred embodiment, an improved multi drill cultivator (1) comprises of;

Octagonal central drum (2),
Gear housing Assembly (3),
Pentagonal Chassis (4),
Drill Ploughing Assembly (5),
Bearing housing (6),
Rear wheel Assembly (7),
Front wheel assembly (8),
Jack screw mechanism assembly (9),
Transverse bar (10),
Seat (11),
Long towing bar (12),
Triangular blade (13.*a*),
Spring and Balancing (14),
Foot rest (15),
Handle for spring (16), According to the FIGS. 1.A, 1.B, 2.A, 2.B, 3.A, 3.B, 4.A and 4.B, The octagonal central drum (2) with an openable cover (3.*i*) on its top is mounted horizontally within the pentagonal chassis (4).

The gear housing assembly (3) is placed inside the octagonal central drum (2). The gear housing assembly (3) further comprises of four spur gears (3.*a*, 3.*b*, 3.*c*, 3.*d*) and four bevel gears (3.*e*, 3.*f*, 3.*g*, 3.*h*) being placed inside the gear housing assembly (3). The said spur gears (3.*a*, 3.*b*, 3.*c*, 3.*d*) and bevel gears (3.*e*, 3.*f*, 3.*g*, 3.*h*) are divided into two pairs, each pair consists of two spur gears (3.*a*, 3.*b*) attached with the said two bevel gears (3.*e*, 3.*f*), mounted on different rear wheel axle, divided so as to reduce the twisting forced occurring during turning of the said improved multi drill cultivator by the animal. Further, Spur gears are made from high grade steel (EN 32) making the multi-drill cultivator thinner and lighter then the previous commercially available multi drill cultivator thus it helps to reduce the weight, cost and pulling force while maintaining the efficiency of the multi drill cultivator.

The said four spur gears (3.a, 3.b, 3.c, 3.d) further comprising of the teeth (3.j) which are placed on the surface of the said spur gears (3.a, 3.b, 3.c, 3.d) thus occupying the small space that further compacts the size of the octagonal central drum (2). The spur gears further made thin in design thus with the said arrangement, the effort exerted by the animals to pull the said improved multi drill cultivator (1) is reduced to the minimum thus improving the efficiency of the animals.

Further, FIGS. 1.A, 1.B, 4.A and 9 explains the arrangement of the drill ploughing assembly (5). The drill ploughing assembly (5) comprises of minimum four projected portions (5.a, 5.b, 5.c, 5.d) provided on the body of said octagonal central drum (2). These projected portions (5.a, 5.b, 5.c, 5.d) are connected internally to the said spur gears (3.a, 3.b, 3.c, 3.d) respectively.

FIGS. 1.A, 1.B, 2.A, 2.B and 4.A explains the arrangement of the rear wheel assembly (7). The rear wheel assembly (7) further comprises of two rear wheels i.e. left rear wheel (7.a) and right rear wheel (7.b) connected by a rear wheel axle (central axle) wherein the rear wheel axle is divided into two halves i.e. rear wheel axle parts (7.c and 7.d). The said octagonal central drum (2) is mounted on this said rear wheel axle parts (7.c, 7.d), connecting the two rear wheels i.e. left rear wheel (7.a) and the right rear wheel (7.b). The left rear wheel (7.a) is mounted on rear wheel axle part (7.c) and the right rear wheel is mounted on rear wheel axle part (7.d).

FIGS. 1.A, 1.B, 4.A, 4.B explains the arrangement of the bearing housing assembly (6) wherein the bearing housing assembly (6) further comprises of bearings (6.a, 6.b) and a common collar (6.c). The left end of the right axle and the right end of the left axle is connected by the said bearings (6.a & 6.b) which maintain the alignment of the said axles during pulling and twisting of the said multi drill cultivator (1). The said bearings (6.a, 6.b) are covered with a common collar (6.c) as shown in FIGS. 1.A, 4.A).

Referring to FIGS. 1.A, 1.B, 2.A, 2.B, 4.A, 4.B, the octagonal central drum (2) is rolled on ground with the help of three wheels—two rear wheels (7.a, 7.b) being provided by the sides of said octagonal central drum (2) and the front wheel (8.a). Here as the octagonal central drum (2) is octagonal in shape, the friction exerted by the central drum is reduced as compared to previously used cylindrical drum, thereby increasing the ground clearance.

Referring to FIGS. 1.A, 1.B, 4.A, 4.B, 6.A, 6.B and 6.C, the said front wheel (8.a) is connected with the help of front wheel bracket (8.b) to the said chassis (4) and transverses bar (10) so as to give a direction to the said improved multi drill cultivator. Wherein the said front wheel bracket (8.b) is in 'L' shape wherein one end (8.d) of the said front wheel bracket (8.b) is connected to the front wheel (8.a) and second end (universal joint) (8.f) of the said front wheel bracket (8.a) is connected to the said chassis (4) and third end (8.g) of the said front wheel bracket (8.b) is connected to the said transverse bar (10). Each outwardly projected portion (5.a, 5.b, 5.c, 5.d) is provided with the said drills (5.e, 5.f, 5.g, 5.h) wherein the said drills (5.e, 5.f, 5.g, 5.h) face towards front wheel (8.a). The angulations of projected rotating drills (5.e, 5.f, 5.g, 5.h) is done by jackscrew mechanism (9), which is operated through a lifting screw steering wheel (9.a) attached at the top of the said jack screw mechanism (9) wherein the said projected drills are operating in circular motion, thus giving uniform deep furrows.

Referring to FIGS. 1.A, 1.B, 6.A, 6.B, 6.C, and 7, the jack screw mechanism assembly (9) is provided to operate the said drills (5.e, 5.f, 5.g, 5.h). A jack screw mechanism (9) is provided for adjusting angular movement of the drills (5.e, 5.f, 5.g, 5.h).

A jack screw mechanism (9) further comprises of lifting screw steering wheel (9.a), a guide bar (9.b) being attached to the lifting screw steering wheel (9.a), and a ball (9.c) wherein the said ball (9.c) is fixed into the locking for ball (9.d), provided at the end of the said jack screw mechanism assembly (9). When a man sitting on the said seat rotates the said lifting screw steering wheel (9.a) in clockwise direction, the said guide bar (9.b) will be pushed down towards the said ball (9.c), locking the square threads (9.d) provided on the said guide bar (9.b) further lifting the octagonal chamber (2) along with the drill plough assembly thus fixing the angular position of the said drills (5.e, 5.f, 5.g, 5.h) so as to make constant deep furrows.

When a man sitting on the said seat rotates the said lifting screw steering wheel (9.a) in anticlockwise direction, the said guide bar (9.b) will be pulled towards upward direction, unlocking the said square threads (9.f) thus relieving the angular position of said drills (5.e, 5.f, 5.g, 5.h). Here the said drills (5.e, 5.f, 5.g, 5.h) are operating in circular motion thus making deep furrows.

Referring to FIGS. 1.A and 1.B, the multi drill cultivator (1) of the present invention, a transverse bar (10) is fixed near the top of front wheel (8.a) by universal joint (8.f), where on each side one bullock is harnessed with the help of a wooden cross bar, conventionally used by the farmer.

According to another embodiment of the present invention, the driving mechanism includes human being, animal or any prime mover.

Referring to FIGS. 1.A, 1.B, 2.A and 2.B, a triangular blade (13.a) is fixed on both the sides, just behind the rear wheels (7.a and 7.b), so as to deepen the rear wheel pressure furrow. These blades can be adjusted by clasp knife mechanism using a spring and balancing (14). A handle for spring (16) is provided so as to operate the triangle blade (13.a) by sitting only. A foot rest (15) is provided to rest the foot thus provide relaxation to the man sitting on the said seat (11);

An lock nut (8.f) is provided on front wheel hub (8.c) fork to avoid acute turn which helps in continuous drilling.

A seat (11) is provided on top of the octagonal central drum (2). The farmer rides on the said seat (11) that is fixed on an openable top cover of the said octagonal central drum (2) and drives the bullocks in a direction proposed to be cultivated.

In a further embodiment, a triangular blade (13.a) is replaced with a spade (13.b) which is fixed on both the sides, just behind the rear wheels (7.a, 7.b), so as to make level rear wheel pressure furrow.

As the bullocks move further, the wheel motion, through gearbox within the octagonal central drum (2), rotates all the four said drills (5.e, 5.f, 5.g, 5.h) along with its respective axis and making multiple furrows at a time, as according to the number of drills fitted to the said octagonal central drum (2).

The present invention multi drill cultivator (1) cultivates the land using animals as the prime mover, thereby reducing the consumption of the non renewable sources of energy. Also, the animals can be saved from the slaughter houses. Animals are also providing their dung as natural source of fertilizers to the cultivated land.

Improvement over the Indian Patent IN224088

The granted Indian Patent IN224088 has disclosed a multi drill cultivator wherein the invention has provided a common rear wheel axle wherein all the ploughing drills with the said projected portion were connected to the said common central rear wheel axle. As a result of the same, when the bullocks turned in any direction (as left or right), a twisting force was produced which resulted in cessation of the rotating drills. So during the turning and pulling, load of the whole cultivator increased with extremity which gave additional burden to the animal for driving the cultivator.

Whereas in the present invention, a solution is provided by dividing the burden of the two rear wheels. For the same, the said central axle is divided into two halves wherein two separate pairs of gears have been provided. One pair of the said spur gears (3.a, 3.b) is mounted on the said rear wheel axle part (7.c) which is connected to the said pair of bevel gears (3.e, 3.f) and the assembly of the said gears is connected to the said projected portion (5.a, 5.b) which is further connected to the drills (5.e, 5.f) respectively. The second pair of gear (3.c, 3.d) is connected to the pair of bevel gears (3.g, 3.h) and the assembly of the said gears is connected to the said projected portion (3.c, 3.d) which is further connected to the drills (5.g, 5.h) respectively. As a result, the left rear wheel (7.a) will rotate the left side two drills (5.e, 5.f), and the right rear wheel (7.b) will rotate the right side two drills (5.e, 5.f). Thus the animals or cattle can turn on any side without having to carry any extra load on self, for cultivating the land more efficiently.

In a further embodiment, Planting seeds device or any other device which is helpful in the farming, seeding or watering the agricultural land may be optionally attached to the multi drill cultivator thus helps in increasing the work efficiency while maintaining the low weight and the cost of the multi drill cultivator as well as the reducing the cost of the farming the land.

Working of the Invention

The bullocks are first mounted at the long transverse bars (10). As the bullocks walk further, the wheel motion, through gearbox within the octagonal central drum (2), rotates all the said four big drills (5.e, 5.f, 5.g, 5.h) along with their respective axis making multiple furrows at a time, as according to the number of drills fitted. The rear wheel axle is divided into two halves (7.c, 7.d) which are joined by a bearing assembly.

The twisting force occurring when the bullock turns left is minimized as the pulling of only the right wheel is required due to load separation on the rear wheel axle into two parts. Similarly, when the bullock turns right, the twisting force is minimized as the pulling of only the left wheel is required. Thus the bullocks are required to apply lesser exertion for pulling and twisting the cultivator (1) thus giving an efficient output.

The invention claimed is:

1. A multi drill cultivator for cultivating land comprising:
a pentagonal chassis;
an octagonal central drum coupled to the chassis;
a bearing housing assembly housed within the central drum;
a gear housing assembly housed within the central drum;
a drill ploughing assembly coupled to the chassis, the drill ploughing assembly comprising a plurality of drills;
a rear wheel assembly rotatably coupled to the chassis;
a front wheel assembly rotatably coupled to the chassis;
a jack screw mechanism coupled to the chassis and configured to
adjust the angular position of the drills;
a transverse bar coupled to the chassis adjacent the front wheel assembly;
a seat supported by the chassis;
a long towing bar coupled to a forward end of the transverse bar;
a blade coupled to the chassis at a position behind the rear wheel assembly;
a clasp knife mechanism configured to deploy the blade;
a foot rest coupled to the chassis; and
a handle connected to the clasp knife mechanism.

2. The multi drill cultivator of claim 1, wherein the octagonal central drum further comprises a cover on its top.

3. The multi drill cultivator of claim 1, wherein the octagonal central drum is placed horizontally within the pentagonal chassis.

4. The multi drill cultivator of claim 1, wherein the gear housing assembly further comprises a plurality of spur gears and a plurality of bevel gears.

5. The multi drill cultivator of claim 1, wherein the rear wheel assembly comprises a first rear axle portion, a second rear axle portion rotatable independently of the first rear axle portion, a first rear wheel mounted to the first rear axle portion and a second rear wheel mounted to the second rear axle portion.

6. The multi drill cultivator of claim 5, wherein the bearing housing assembly further comprises first and second bearings, the first bearings supporting an inner end portion of the first rear axle portion, the second bearings supporting an inner end portion of the second rear axle portion.

7. The multi drill cultivator of claim 6, wherein the bearing housing assembly further comprises a collar for the first and second bearings.

8. The multi drill cultivator of claim 1, wherein the front wheel assembly further comprises a front wheel bracket mounted to the chassis and a front wheel rotatably mounted to the front wheel bracket bracket.

9. The multi drill cultivator of claim 1, wherein the jack screw mechanism comprises a lifting screw steering wheel, a guide bar attached to the lifting screw steering wheel, a drum lifting block, a ball, and a locking for the ball.

10. The multi drill cultivator of claim 4, wherein:
the plurality of spur gears comprise a first set of spur gears and a second set of spur gears; and
the rear wheel assembly comprises a first rear axle portion and a second rear axle portion rotatable independently of the first rear axle portion, the first set of spur gears being mounted on the first rear axle portion and the second set of spur gears being mounted on the second rear axle portion.

11. The multi drill cultivator of claim 4, wherein:
each of the plurality of bevel gears engages a respective one of the plurality of spur gears; and
the plurality of spur gears and the plurality of bevel gears are placed inside the gear housing assembly.

12. The multi drill cultivator of claim 4, wherein each of the spur gears comprises a side surface having teeth formed thereon.

13. The multi drill cultivator of claim 5, wherein the rear wheels are positioned at opposite ends of the octagonal central drum.

14. The multi drill cultivator of claim 8, wherein the front wheel is connected to a forward end of the pentagonal chassis.

15. The multi drill cultivator of claim 8, wherein the front wheel assembly further comprises a front wheel bracket hub and a lock nut provided on the front wheel bracket hub to avoid acute turning of the multi drill cultivator.

16. The multi drill cultivator of claim 9, wherein the ball is fixed in the locking for the ball provided at an end of the jack screw mechanism assembly.

17. The multi drill cultivator of claim 1, wherein the seat is supported at a position above the octagonal central drum.

18. The multi drill cultivator of claim 1, wherein:
the rear wheel assembly comprises first and second rear wheels; and
the blade comprises first and second blades, the first blade being supported behind the first rear wheel and the second blade being supported behind the second rear wheel.

19. The multi drill cultivator of claim 18, wherein the first and second blades comprise triangular blades configured to deepen the rear wheel pressure furrow.

20. The multi drill cultivator of claim 18, wherein the first and second blades comprise spades configured to level the rear wheel pressure furrow.

21. The multi drill cultivator of claim 1, wherein the handle is configured so as to operate the blade when manipulated by an occupant of the seat.

22. The multi drill cultivator of claim 1, wherein the clasp knife mechanism comprises a spring and balancing assembly.

* * * * *